United States Patent
Yu et al.

(10) Patent No.: US 12,105,003 B2
(45) Date of Patent: Oct. 1, 2024

(54) SYSTEM AND METHOD FOR TESTING A FILTER

(71) Applicant: TAIWAN SEMICONDUCTOR MANUFACTURING COMPANY LTD., Hsinchu (TW)

(72) Inventors: Chwen Yu, Taipei (TW); En Tian Lin, Hsinchu (TW); Chi Wen Kuo, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 344 days.

(21) Appl. No.: 17/461,955

(22) Filed: Aug. 30, 2021

(65) Prior Publication Data
US 2023/0066472 A1    Mar. 2, 2023

(51) Int. Cl.
| | |
|---|---|
| *G01N 15/06* | (2024.01) |
| *G01N 15/02* | (2006.01) |
| *G01N 15/08* | (2006.01) |
| *G01N 15/10* | (2006.01) |
| *G01N 35/00* | (2006.01) |
| *B25J 11/00* | (2006.01) |

(52) U.S. Cl.
CPC ......... *G01N 15/0656* (2013.01); *G01N 15/02* (2013.01); *G01N 15/06* (2013.01); *G01N 15/0826* (2013.01); *G01N 15/10* (2013.01); *G01N 35/00584* (2013.01); *G01N 35/0099* (2013.01); *B25J 11/00* (2013.01); *G01N 2015/0662* (2013.01); *G01N 2015/084* (2013.01); *G01N 2015/1024* (2024.01)

(58) Field of Classification Search
CPC .... G01N 15/0656; G01N 15/02; G01N 15/06; G01N 15/0826; G01N 15/10; G01N 35/00584; G01N 35/0099; G01N 2015/0662; G01N 2015/084; G01N 2015/1062
See application file for complete search history.

(56) References Cited

U.S. PATENT DOCUMENTS

| | | | |
|---|---|---|---|
| 2003/0078751 A1* | 4/2003 | Juhasz | .................... F04B 51/00 700/285 |
| 2004/0038013 A1* | 2/2004 | Schaefer | ............ B01D 39/1623 156/181 |
| 2020/0056978 A1 | 2/2020 | Lin et al. | |

\* cited by examiner

*Primary Examiner* — Benjamin R Schmitt
(74) *Attorney, Agent, or Firm* — WPAT LAW; Anthony King

(57) ABSTRACT

A system and a method for testing a filter used in ultrapure water are provided. The method for testing a filter, which is used for removing particles from ultrapure water, comprises: providing a testing solution with particles; detecting the particles in the testing solution by a particle counter; passing the testing solution through a filter; and detecting the particles in the testing solution, which is passed through the filter, by another particle counter.

20 Claims, 6 Drawing Sheets

SYSTEM AND METHOD FOR TESTING A FILTER

BACKGROUND

With the advance of semiconductor production technology in recent years, semiconductors are to be produced with a higher and higher packing density and a smaller and smaller line width. Ultrapure water for use as a cleaning liquid in semiconductor production processes is therefore adopted to have contents of particles being reduced to the limit. Accordingly, strict demands are made on the techniques for removing particles from ultrapure water to be used in the semiconductor industry.

Ultrapure water, highly purified by an ultrapure water production system, is subjected to further removal of particles immediately before a point of use (POU) in semiconductor production processes. Filtration is the only one technique as a technique for removing particles immediately before the point of use. Currently, there is no method for testing the filter retention efficiency of the filter used in the ultrapure water.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
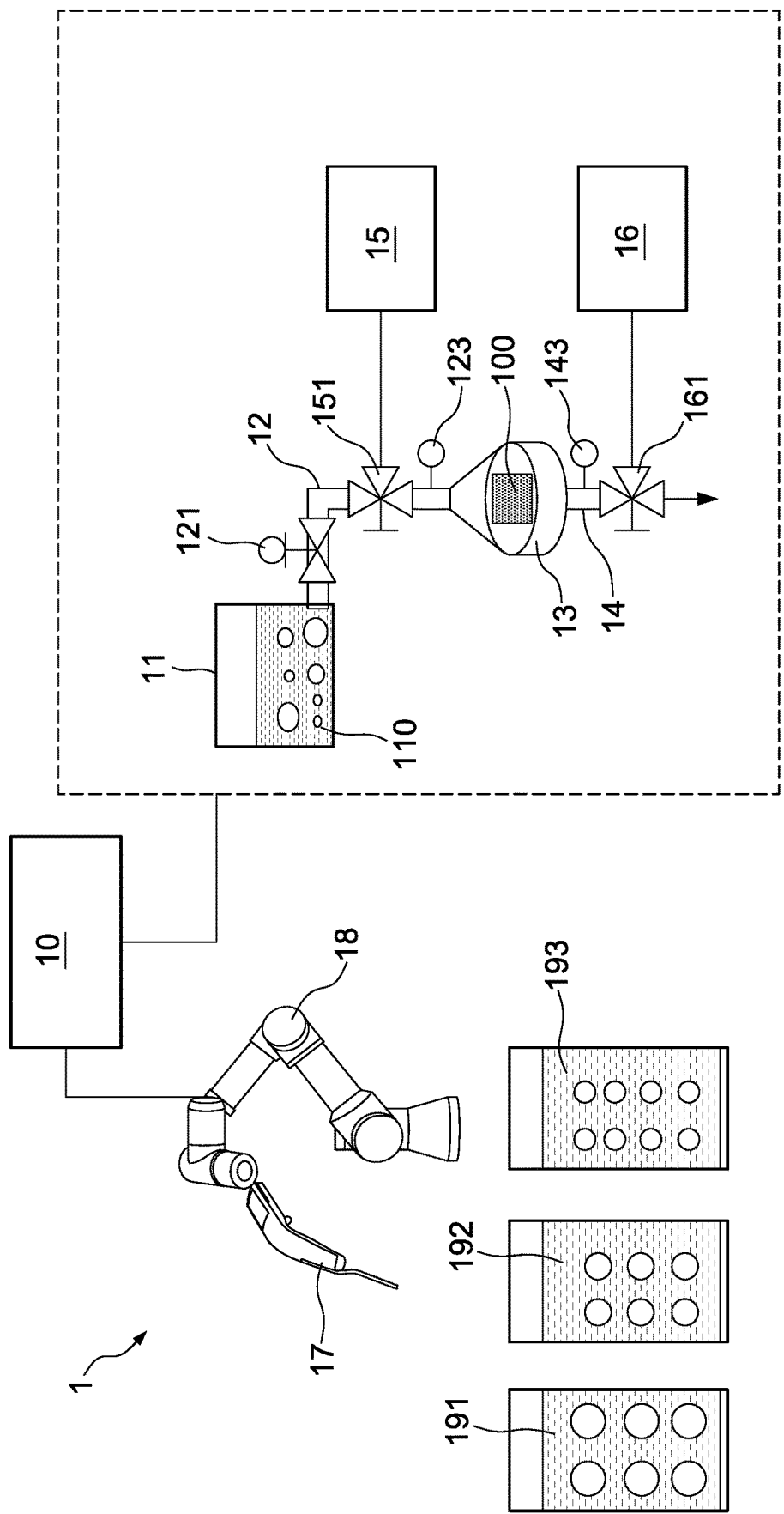
FIG. 1 is a schematic view of a test system for testing a filter in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

This description of illustrative embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present disclosure. Relative terms such as "lower," "upper," "horizontal," "vertical,", "above," "below," "up," "down," "top" and "bottom" as well as derivative thereof (e.g., "horizontally," "downwardly," "upwardly." etc.) should be construed to refer to the orientation as then described or as shown in the drawing under discussion. These relative terms are for convenience of description only and do not require that the apparatus be constructed or operated in a particular orientation. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the embodiments. Accordingly, the disclosure expressly should not be limited to such embodiments illustrating some possible non-limiting combination of features that may exist alone or in other combinations of features; the scope of the disclosure being defined by the claims appended hereto.

Semiconductor device manufacturing consumes large quantities of water for a variety of purposes ranging from equipment cooling to wafer surface cleaning. Ultrapure water is adopted for many process steps. Early stages of device fabrication include repeated steps for wafer cleaning, rinsing and surface conditioning. At many different stages in device manufacturing, it is used for surface cleaning, wet etch, solvent processing, and chemical mechanical planarization.

Ultrapure water, highly purified by an ultrapure water production system, is subjected to further removal of particles immediately before a point of use (POU) in semiconductor production processes. Filtration is the only one technique as a technique for removing particles immediately before the point of use.

However, the filters used for removing the particles from the ultrapure water are usually not as effective as claimed by the vendors. There is no method for testing the filter retention efficiency of the filter used in the ultrapure water.

In addition, to check the detecting efficiency of the liquid counter detector used for detecting the nanometers particles in the ultrapure water is also an important issue.

Present disclosure provides a test system and a method for testing the filter used for removing the particles from the ultrapure water.

FIG. 1 is a schematic view of a test system 1 in accordance with some embodiments of the present disclosure. In some embodiments of the present disclosure, the test system 1 is used for testing the filter retention efficiency of the filter 100 used in the ultrapure water. The test system 1 includes a container 11, a passageway 12, a jig 13, a passageway 14, two liquid particle counters 15, 16, an electronic pipet 17, a robot arm 18 and a processor 10. The container 11 is configured to receive a testing solution 110 with particles. A number of the particles in the testing solution 110 is known and a particle size of the particles in the testing solution 110 is known. In some embodiments of the present disclosure, the particle size of the particle in the testing solution 110 is about 20 nanometers to 50 nanometers. In some embodiments of the present disclosure, the number of the particles in the testing solution 110 is about 100/ml to 500/ml. In some embodiments of the present disclosure, the testing solution 110 is prepared by diluting high concentration solutions 191, 192 and 193. Each of the high concentration solutions 191, 192 and 193 includes particles. In some embodiments of the present disclosure, a particle size of the particles in the high concentration solution 191 is about 35 nanometers to 45 nanometers and a number of the particles in the high concentration solution 191 is about $10^5$/ml. In some embodiments of the present disclosure, a particle size of the particles in the high concentration solution 192 is about 25 nanometers to 35 nanometers and a number of the particles in the high concentration solution 192 is about $10^5$/ml. In some embodiments of the present disclosure, a particle size of the particles in the high concentration solution 193 is about 15 nanometers to 25 nanometers and a number of the particles in the high concentration solution 193 is about $10^5$/ml.

The passageway 12 may be connected to the container 11 and in in fluid communication with the container 11. Thus, the testing solution 110 in the container 11 may be flowed into the passageway 12. In some embodiments of the present disclosure, the passageway 12 includes a flow rate controller 121. The flow rate controller 112 is configured to control the flow rate of the testing solution 110 in the passageway 12. The flow rate controller 112 may be connected to the processor 10, and thus driven and/or operated by the processor 10. In some embodiments of the present disclosure, the passageway 12 includes a pressure gauge 123. The pressure gauge 123 is configured to detect the pressure of the testing solution 110 in the passageway 12. The pressure gauge 123 may be connected to the processor 10 and thus the pressure gauge 123 is configured to transfer the detected pressure value to the processor 10.

Further, the liquid particle counter 15 may be connected to the passageway 12. In some embodiments of the present disclosure, the liquid particle counter 15 is connected to the passageway 12 through a valve 151. A portion of the testing solution 110 may flow from the passageway 12 to the liquid particle counter 15 through the valve 15, and thus the liquid particle counter 15 is configured to detect a number of the particles in the testing solution 110 in the passageway 12. The liquid particle counter 15 may include sensing electrodes. Moreover, the liquid particle counter 15 may be connected to the processor 10, and thus the liquid particle counter 15 is configured to transfer the detected data to the processor 10.

The jig 13 may be connected to the passageway 12. The jig 13 is configured to mount a filter 100 to be tested therein, and thus the testing solution 110 flows into the jig 13 and flows through the filter 100 which is mounted by the jig 13.

The passageway 14 may be connected to the jig 13 and in fluid communication with the jig 13. Thus, the testing solution 110 passing through the filter 100 mounted by the jig 13 may further flow into the passageway 14. In some embodiments of the present disclosure, the passageway 14 includes a pressure gauge 143. The pressure gauge 143 is configured to detect the pressure of the testing solution 110 in the passageway 14. Thus, a pressure drop of the testing solution between the passageway 12 and the passageway 14 could be obtained. The pressure gauge 143 may be connected to the processor 10 and thus the pressure gauge 143 is configured to transfer the detected pressure value to the processor 10.

Further, the liquid particle counter 16 may be connected to the passageway 14. In some embodiments of the present disclosure, the liquid particle counter 16 is connected to the passageway 14 through a valve 161. A portion of the testing solution 110 may flow from the passageway 14 to the liquid particle counter 16 through the valve 16, and thus the liquid particle counter 16 is configured to detect a number of the particles in the testing solution 110 in the passageway 14. The liquid particle counter 16 may include sensing electrodes. Moreover, the liquid particle counter 16 may be connected to the processor 10, and thus the liquid particle counter 16 is configured to transfer the detected data to the processor 10.

Since the liquid particle counter 15 is configured to detect the number of the particles in the testing solution 110 prior to passing through the filter 100 and the liquid particle counter 16 is configured to detect the number of the particles in the testing solution 110 after passing through the filter 100, the number of the particles retained in the filter 100 is obtained. That is, the difference between the data detected by the liquid particle counter 15 and the data detected by the liquid particle counter 16 may be equal to the number of the particles retained in the filter 100.

As mentioned above, the testing solution 110 is prepared by diluting the high concentration solutions 191, 192, 193. The electronic pipet 17 and the robot arm 18 are used to mix the testing solution 110 from the high concentration solutions 191, 192, 193. Since the testing solution 110 is mixed by the electronic pipet 17 and the robot arm 18, the testing solution 110 is prevented from man-made pollution and the number of the particles in the testing solution 110 is well-controlled. The electronic pipet 17 and the robot arm 18 may be connected to the processor 10 and thus they are controlled and operated by the processor 10. In some embodiments of the present disclosure, the electronic pipet 17 and the robot arm 18 are configured to supply the testing solution 110 into the container 11.

Referring to FIG. 1, the processor 10 may control the electronic pipet 17 and the robot arm 18 to sample the high concentration solutions 191, 192,193 and mix the testing solution 110. The size of the particles and the number of the particles in the testing solution 110 are known. Then the testing solution 110 may be supplied into the container 11. The testing solution 110 may flow from the container 11 into the passageway 12. The processor 10 may control the flow rate of the testing solution 110 flowing into the passageway 12 by the flow rate controller 121. Further, a portion of the testing solution 110 may flow to the liquid particle counter 15 through the valve 151, so that the liquid particle counter 15 may detect the number of the particles in the testing solution 110 prior to passing through the filter 100. In some embodiments of the present disclosure, the liquid particle counter 15 may transfer the data of the number of the particles in the test solution 110 to the processor 10. Then the test solution 110 may flow into the jig 13 and pass through the filter 100. After passing through the filter 100, the testing solution 110 may flow into the passageway 14. Further, a portion of the testing solution 110 may flow to the liquid particle counter 16 through the valve 161, so that the liquid particle counter 16 may detect the number of the particles in the test solution 110 after passing through the filter 100. In some embodiments of the present disclosure, the liquid particle counter 16 may transfer the data of the number of the particles in the test solution 110 to the processor 10.

Further, the number of the particles retained in the filter 100 will be known by comparing the number of the particles detected by the liquid particle counter 15 and the number of the particles detected by the liquid particle counter 16, and thus the filter retention efficiency of the filter 100 is obtained. In addition, the pressure gauges 123 and 143 are configured to monitor the pressure drop between the testing solution 110 in the passageway 12 and the testing solution 110 in the passageway 14, and thus a pressure drop of the filter 100 is obtained. In some embodiments of the present disclosure, the pressure drop of the filter 100 can be controlled or set by the processor 10.

Figure 2:
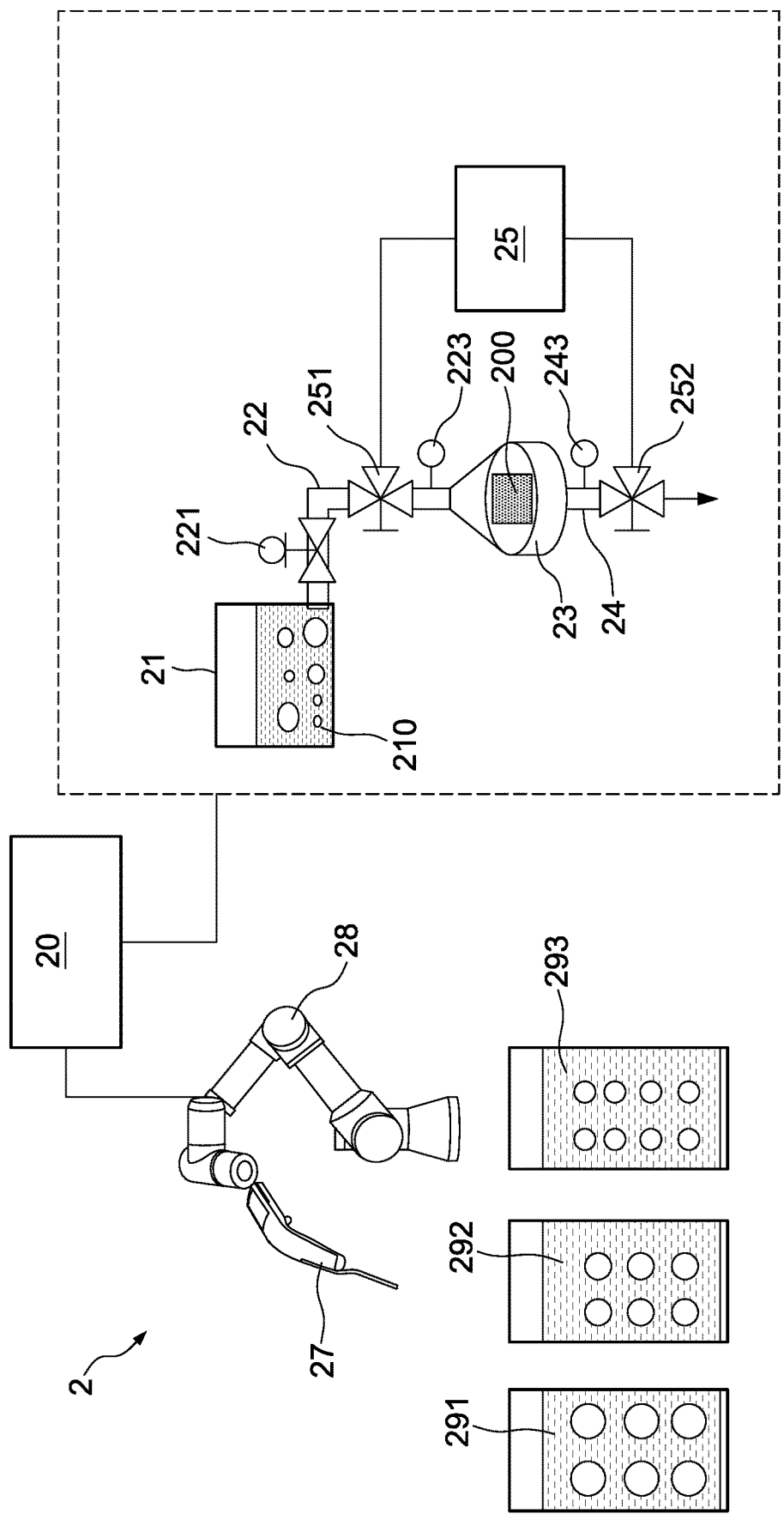
FIG. 2 is a schematic view of a test system for testing a filter in accordance with some embodiments of the present disclosure.

FIG. 2 is a schematic view of a test system 2 in accordance with some embodiments of the present disclosure. In some embodiments of the present disclosure, the test system 2 is used for testing the filter retention efficiency of the filter 200 used in the ultrapure water. The test system 2 includes a container 21, a passageway 22, a jig 23, a passageway 24, a liquid particle counters 25, an electronic pipet 27, a robot arm 28 and a processor 20. The container 21 is configured to receive a testing solution 210 with particles. A number of the particles in the testing solution 210 is known and a particle size of the particles in the testing solution 210 is known. In some embodiments of the present disclosure, the particle size of the particle in the testing solution 210 is about 20 nanometers to 50 nanometers. In some embodiments of the present disclosure, the number of the particles in the testing solution 210 is about 100/ml to 500/ml. In some embodiments of the present disclosure, the testing solution 210 is prepared by diluting high concentration solutions 291, 292 and 293. Each of the high concentration solutions 291, 292 and 293 includes particles. In some embodiments of the present disclosure, a particle size of the particles in the high concentration solution 291 is about 35 nanometers to 45 nanometers and a number of the particles in the high concentration solution 291 is about $10^5$/ml. In some embodiments of the present disclosure, a particle size of the particles in the high concentration solution 292 is about 25 nanometers to 35 nanometers and a number of the particles in the high concentration solution 292 is about $10^5$/ml. In some embodiments of the present disclosure, a particle size of the particles in the high concentration solution 293 is about 15 nanometers to 25 nanometers and a number of the particles in the high concentration solution 293 is about $10^5$/ml.

The passageway 22 may be connected to the container 21 and in in fluid communication with the container 21. Thus, the testing solution 210 in the container 21 may be flowed into the passageway 22. In some embodiments of the present disclosure, the passageway 22 includes a flow rate controller 221. The flow rate controller 212 is configured to control the flow rate of the testing solution 210 in the passageway 22. The flow rate controller 212 may be connected to the processor 20, and thus driven and/or operated by the processor 20. In some embodiments of the present disclosure, the passageway 22 includes a pressure gauge 223. The pressure gauge 223 is configured to detect the pressure of the testing solution 210 in the passageway 22. The pressure gauge 223 may be connected to the processor 20 and thus the pressure gauge 223 is configured to transfer the detected pressure value to the processor 20.

The jig 23 may be connected to the passageway 22. The jig 23 is configured to mount a filter 200 to be tested therein, and thus the testing solution 210 flows into the jig 23 and flows through the filter 200 which is mounted by the jig 23.

The passageway 24 may be connected to the jig 23 and in fluid communication with the jig 23. Thus, the testing solution 210 passing through the filter 200 mounted by the jig 23 may further flow into the passageway 24. In some embodiments of the present disclosure, the passageway 24 includes a pressure gauge 243. The pressure gauge 243 is configured to detect the pressure of the testing solution 210 in the passageway 24. Thus, a pressure drop of the testing solution between the passageway 22 and the passageway 24 could be obtained. The pressure gauge 243 may be connected to the processor 20 and thus the pressure gauge 243 is configured to transfer the detected pressure value to the processor 20.

Further, the liquid particle counter 25 may be connected to the passageways 22 and 24. In some embodiments of the present disclosure, the liquid particle counter 25 is connected to the passageway 22 through a valve 251. In some embodiments of the present disclosure, the valve 251 is a three way valve. Thus, the valve 251 may be switched so that the testing solution 210 flows from the passageway 22 to the liquid counter 25, and the liquid particle counter 25 is configured to detect a number of the particles in the testing solution 210 in the passageway 22. In some embodiments of the present disclosure, the liquid particle counter 25 is connected to the passageway 24 through a valve 252. In some embodiments of the present disclosure, the valve 252 is a three way valve. Thus, the valve 252 may be switched so that the testing solution 210 flows from the passageway 24 to the liquid counter 25, and the liquid particle counter 25 is configured to detect a number of the particles in the testing solution 210 in the passageway 24. The liquid particle counter 25 may include sensing electrodes. Moreover, the liquid particle counter 25 may be connected to the processor 20, and thus the liquid particle counter 25 is configured to transfer the detected data to the processor 10.

Since the liquid particle counter 25 is configured to detect the number of the particles in the testing solution 210 prior to passing through the filter 200 and the number of the particles in the testing solution 210 after passing through the filter 200, the number of the particles retained in the filter 200 is obtained. In addition, since the particles in the testing solution 210 prior to passing through the filter 200 and the particles in the testing solution 210 after passing through the filter 200 are detected by the same liquid particle counter 25, the error between two different liquid particle counters could be avoided.

As mentioned above, the testing solution 210 is prepared by diluting the high concentration solutions 291, 292, 293. The electronic pipet 27 and the robot arm 28 are used to mix the testing solution 210 from the high concentration solutions 291, 292, 293. Since the testing solution 210 is mixed by the electronic pipet 27 and the robot arm 28, the testing solution 210 is prevented from man-made pollution and the number of the particles in the testing solution 210 is well-controlled. The electronic pipet 27 and the robot arm 28 may be connected to the processor 20 and thus they are controlled and operated by the processor 20. In some embodiments of the present disclosure, the electronic pipet 27 and the robot arm 28 are configured to supply the testing solution 210 into the container 21.

Referring to FIG. 2, the processor 20 may control the electronic pipet 27 and the robot arm 28 to sample the high concentration solutions 291, 292,293 and mix the testing solution 210. The size of the particles and the number of the particles in the testing solution 210 are known. Then the testing solution 210 may be supplied into the container 21. The testing solution 210 may flow from the container 12 into the passageway 22. The processor 20 may control the flow rate of the testing solution 210 flowing into the passageway 22 by the flow rate controller 221. Further, the valve 251 may be switched so that the testing solution 110 may flow to the liquid particle counter 25 and the liquid particle counter 25 may detect the number of the particles in the testing solution 210 prior to passing through the filter 200. In some embodiments of the present disclosure, the liquid particle counter 25 may transfer the data of the number of the particles in the test solution 210 to the processor 20. After the liquid particle counter 25 detects the testing solution 210 from the passageway 22, the valve 251 may further switched so that the test solution 210 may flow into the jig 23 and pass through the filter 200. After passing through the filter 200, the testing solution 210 may flow into the passageway 24. Further, the valve 252 may be switched so that the testing solution 210 may flow from the passageway 24 to the liquid particle counter 25 and the liquid particle counter 25 may detect the number of the particles in the test solution 210 after passing through the filter 200. In some embodiments of the present disclosure, the liquid particle counter 25 may transfer the data of the number of the particles in the test solution 210 to the processor 20. Further, the number of the particles retained in the filter 200 will be known by comparing the numbers of the particles detected by the liquid particle counter 25, and thus the filter retention efficiency of the filter 200 is obtained. In addition, the pressure gauges 223 and 243 are configured to monitor the pressure drop between the testing solution 210 in the passageway 22 and the testing solution 210 in the passageway 24, and thus a pressure drop of the filter 200 is obtained. In some embodiments of the present disclosure, the pressure drop of the filter 200 can be controlled or set by the processor 20.

Figure 3:
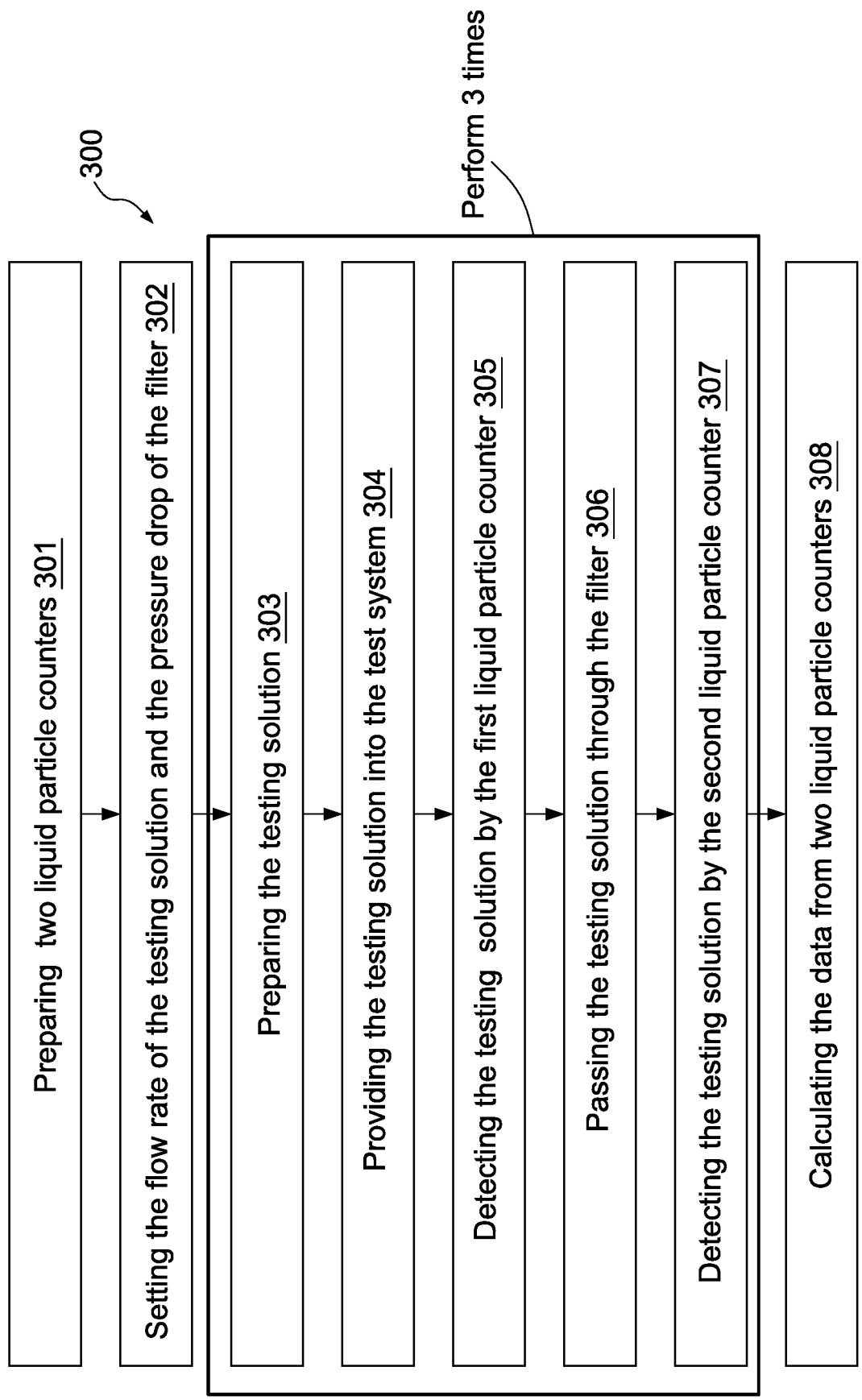
FIG. 3 is a flow chart representing exemplary operations of the method for testing a filter used in ultrapure water, in accordance with some embodiments of the present disclosure.

FIG. 3 is a flow chart representing exemplary operations of the method for testing a filter used in ultrapure water, in accordance with some embodiments of the present disclosure. The method 300 as shown in FIG. 3 is related to testing the filter 100 by using the test system 1.

In operation 301, two liquid particle counters 15 and 16 are prepared. Each of the liquid particle counters 15 and 16 is able to detect the solution with particles, in which a particle size of the particles is about 20 nanometers and a number of the particles is about 10/ml.

In operation 302, the processor 10 may control the flow rate controller 121 and/or pressure gauges 123, 143, so that the flow rate of the testing solution 110 and the pressure drop of the filter 100 are set.

In operation 303, the testing solution 110 is prepared. As above-mentioned, the testing solution 110 may be prepared by diluting the high concentration solutions 191, 192 and 193. In some embodiments of the present disclosure, the processor 10 controls the electronic pipet 17 and the robot arm 18 to sample the high concentration solutions 191, 192, 193 so as to mix the testing solution 110. In some embodiments of the present disclosure, a particle size of the particles in the testing solution 110 is about 20 nanometers. In some embodiments of the present disclosure, a particle size of the particles in the testing solution 110 is about 15 to 25 nanometers. In some embodiments of the present disclosure, a particle size of the particles in the testing solution 110 is about 25 to 35 nanometers. In some embodiments of the present disclosure, a number of the particles in the testing solution 110 is 100/ml. In some embodiments of the present disclosure, a number of the particles in the testing solution 110 is 500/ml.

In operation 304, the testing solution 110 is provided into the test system 1. As shown in FIG. 1, the testing solution 110 flows from the container 11 into the passageway 12. The flow rate of the testing solution may be controlled by the flow rate controller 121.

In operation 305, the first liquid particle counter 15 is driven to detect the particles in the testing solution 110. As shown in FIG. 1, before the testing solution 110 passes through the filter 100, a portion of the testing solution 110 may flow to the liquid particle counter 15 through the valve 151. That is, the liquid particle counter 15 is configured to detect the particles of the testing solution 110 upstream the filter 100. Thus, the liquid particle counter 15 may count a number of the particles in the testing solution before passing through the filter 100. In some embodiments of the present disclosure, the liquid particle counter 15 transfers the detected data to the processor 10.

In operation 306, the testing solution 110 passes through the filter 100 mounted by the jig 13. While the testing solution 110 passes through the filter 100, some of the particles in the testing solution 110 are retained in the filter 100.

In operation 307, the second liquid particle counter 16 is driven to detect the particles in the testing solution 110. As shown in FIG. 3 after the testing solution 110 passes through the filter 100, a portion of the testing solution may flow to the liquid particle counter 15 through the valve 161. That is, the liquid particle counter 16 is configured to detect the particles of the testing solution 110 downstream the filter 100. Thus, the liquid particle counter 16 may count a number of the particles in the testing solution after passing through the filter 100. Since some particles in the testing solution 110 may be retained in the filter 100, the number of the particles counted by the liquid particle counter 15 may be greater than the number of the particles counted by the liquid particle counter 16. In some embodiments of the present disclosure, the liquid particle counter 16 transfers the detected data to the processor 10.

The operations 303, 304, 305, 306 and 307 may be performed three times or cycles. Since the operations 303, 304, 305, 306 and 307 may be performed three times, the processor 10 may receive three sets of data from the liquid particle counters 15 and 16. That is, the processor may get three sets of the numbers of the particles in the testing solution 110 before passing through the filter 100 and after passing through the filter 100, which are detected by the liquid particle counters 15 and 16.

In operation 308, the processor 10 is configured to receive the detected data from the liquid particle counters 15 and 16 and count the number of the particles retained in the filter. The processor 10 may obtain the filter retention efficiency of the filter 100 by counting the numbers of the particles detected by the liquid particle counters 15 and 16. The filter retention efficiency of the filter 100 may be calculated by the following formula:

$$\text{average}(\text{LPC data}_{upstream} - \text{LPC data}_{downstream})/\text{LPC data}_{upstream},$$

where the "LPC data$_{upstream}$" is the data detected by the liquid particle counter 15 upstream of the filter 100, and thus such data may be the number of the particles in the testing solution 110 before passing through the filter 100, and where the "LPC data$_{downstream}$" is the data detected by the liquid particle counter 16 downstream of the filter 100, and thus such data may be the number of the particles in the testing solution after passing through the filter 100.

In addition, the method 300 for testing filter 100 may be performed by using another testing solution which may have particles with another particle size and/or another number of the particles. In some embodiments of the present disclosure, the operations 303, 304, 305, 306 and 307 may be performed three times or cycles by using a testing solution 110, in which the particle size of the particles is about 20 nanometers and the number of the particles is 100/ml, and then the operations 303, 304, 305, 306 and 307 may be performed three times or cycles again by using another testing solution 110, in which the particle size of the particles is about 20 nanometers and the number of the particles is 500/ml.

Figure 4:
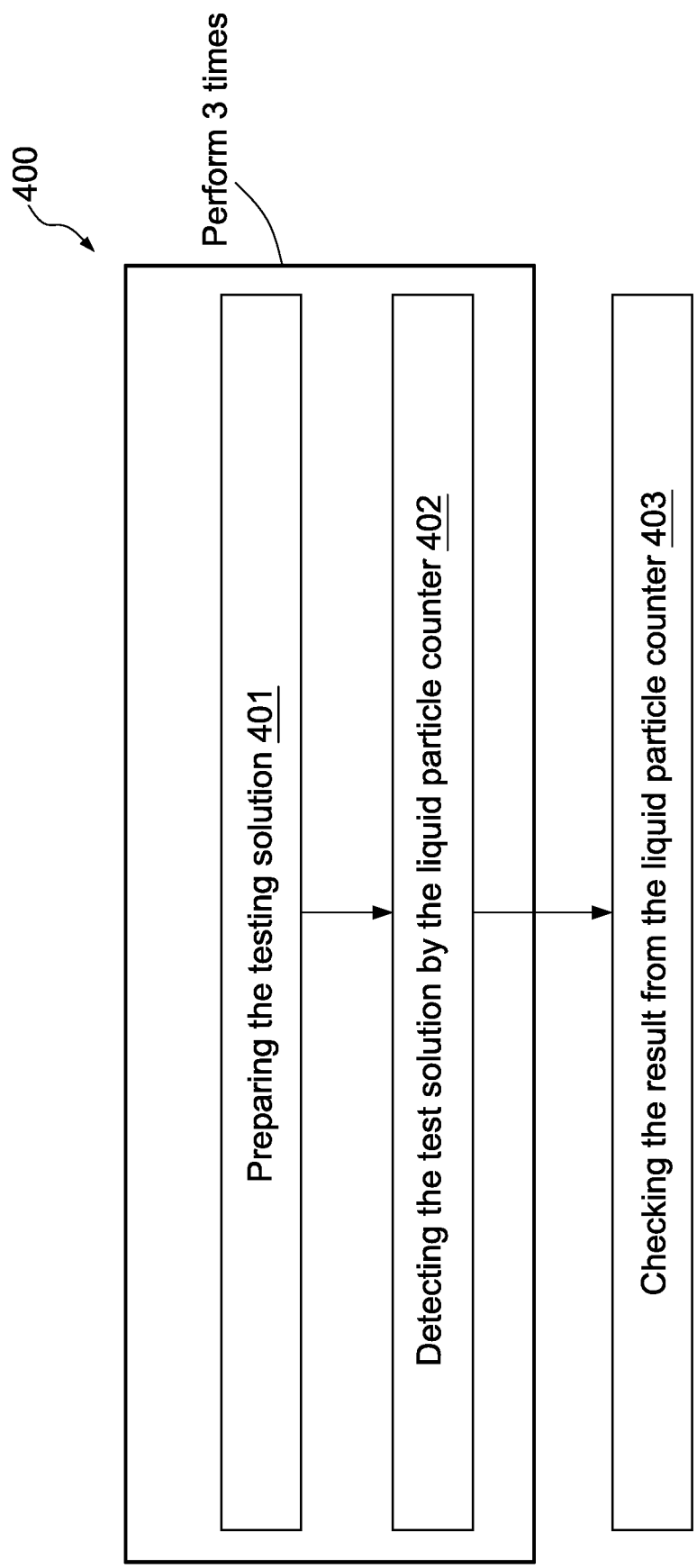
FIG. 4 is a flow chart representing exemplary operations of the method for testing a filter used in ultrapure water, in accordance with some embodiments of the present disclosure.

FIG. 4 is a flow chart representing exemplary operations of the method for testing a filter used in ultrapure water, in accordance with some embodiments of the present disclosure. The method 400 as shown in FIG. 4 is related to checking the detection efficiency of the liquid particle counter. In some embodiments of the present disclosure, the liquid particle counter detects the particles in the solution by the sensing electrodes.

As above-mentioned, the liquid particle counters 15, 16 in the test system 1 may be able to detect the solution with particles, in which a particle size of the particles is about 20 nanometers and a number of the particles is about 10/ml. Thus, to check the detection efficiency of the liquid particle counter is an important issue.

In operation 401, a testing solution is prepared. The testing solution may be prepared by diluting the high concentration solutions. In some embodiments of the present disclosure, a particle size of the particles in the testing solution is about 20 nanometers. In some embodiments of the present disclosure, a particle size of the particles in the testing solution is about 15 to 25 nanometers. In some embodiments of the present disclosure, a particle size of the particles in the testing solution is about 25 to 35 nanometers. In some embodiments of the present disclosure, a number of the particles in the testing solution s 100/ml. In some embodiments of the present disclosure, a number of the particles in the testing solution 110 is 50/ml.

In operation 402, the testing solution is provided to be detected by the liquid particle counter. The liquid particle counter is configured to detect the particles in the testing solution and count the number of the particles in the testing solution.

The operations 401 and 402 may be performed multiple times or cycles. In some embodiments of the present disclosure, the operations 401 and 402 may be performed three times or cycles. Thus, three data detected by the liquid particle counter may be obtained.

In operation 403, the user may check the consistency of the data detected by the liquid particle counter and the detection efficiency of the liquid particle counter so as to certificate whether the liquid particle counter is qualified to be used in the test system 1 as shown in FIG. 1.

In addition, the method 400 for checking the detection efficiency of the liquid particle counter may be performed by using another testing solution which may have particles with another particle size and/or another number of the particles. In some embodiments of the present disclosure, the operations 401 and 402 may be performed three times or cycles by using a testing solution, in which the particle size of the particles is about 20 nanometers and the number of the particles is 100/ml, and then the operations 401 and 402 may be performed three times or cycles again by using another testing solution, in which the particle size of the particles is about 20 nanometers and the number of the particles is 50/ml.

Figure 5:
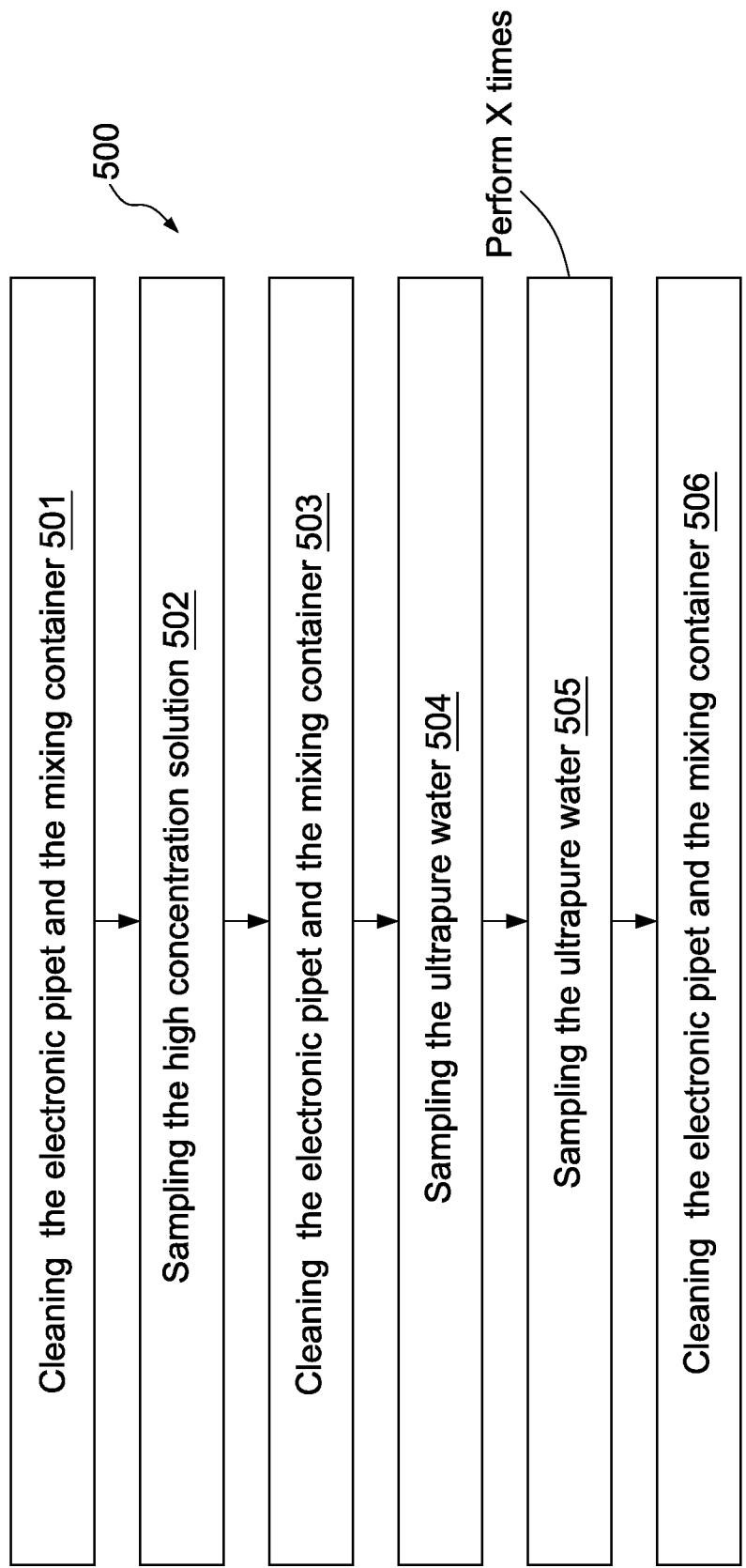
FIG. 5 is a flow chart representing exemplary operations of the method for testing a filter used in ultrapure water, in accordance with some embodiments of the present disclosure.

FIG. 5 is a flow chart representing exemplary operations of the method for testing a filter used in ultrapure water, in accordance with some embodiments of the present disclosure. The method 500 as shown in FIG. 5 is related to preparing a testing solution 110 used for test system 1 as shown in FIG. 1.

For convenience of explanation of the method 500, preparation of the testing solution, in which the particle size of the particles is about 20 nanometers and the number of the particles is about 100/ml, is taken as an example.

In operation 501, an electronic pipet and a mixing container are provided, and the electronic pipet and the mixing container are cleaned by ultrapure water so that there is no desired particle in the electronic pipet and the mixing container. The operation 501 may be performed at least three times.

In operation 502, the electronic pipet is operated to sample 0.1 ml of solution from a high concentration solution, in which a size of the particles is about 20 nanometers and a number of the particles is about $10^5$/ml, and inject the solution into the mixing container.

In operation 503, the electronic pipet and the mixing container are cleaned by ultrapure water so that there is no desired particle in the electronic pipet and the mixing container. The operation 503 may be performed at least three times.

In operation 504, the electronic pipet is operated to sample 9.9 ml of ultrapure water and inject the ultrapure water into the mixing container.

In operation 505, the electronic pipet is operated to sample 10 ml of ultrapure water and inject the ultrapure water into the mixing container. The operation 505 is performed 9 times.

After operations 501, 502, 503, 504 and 505, a testing solution, in which in which the particle size of the particles is about 20 nanometers and the number of the particles is about 100/ml, is provided.

In operation 506, the electronic pipet and the mixing container are cleaned by ultrapure water. The operation 506 may be repeated many times until that the liquid particle counter cannot detect any particle in the electronic pipet and/or the mixing container.

In some embodiments of the present disclosure, the electronic pipet may be controlled by a robot arm. In some embodiments of the present disclosure, the operations 501, 502, 503, 504, 505 and 506 may be programmable in the computer or in the processor.

Figure 6:
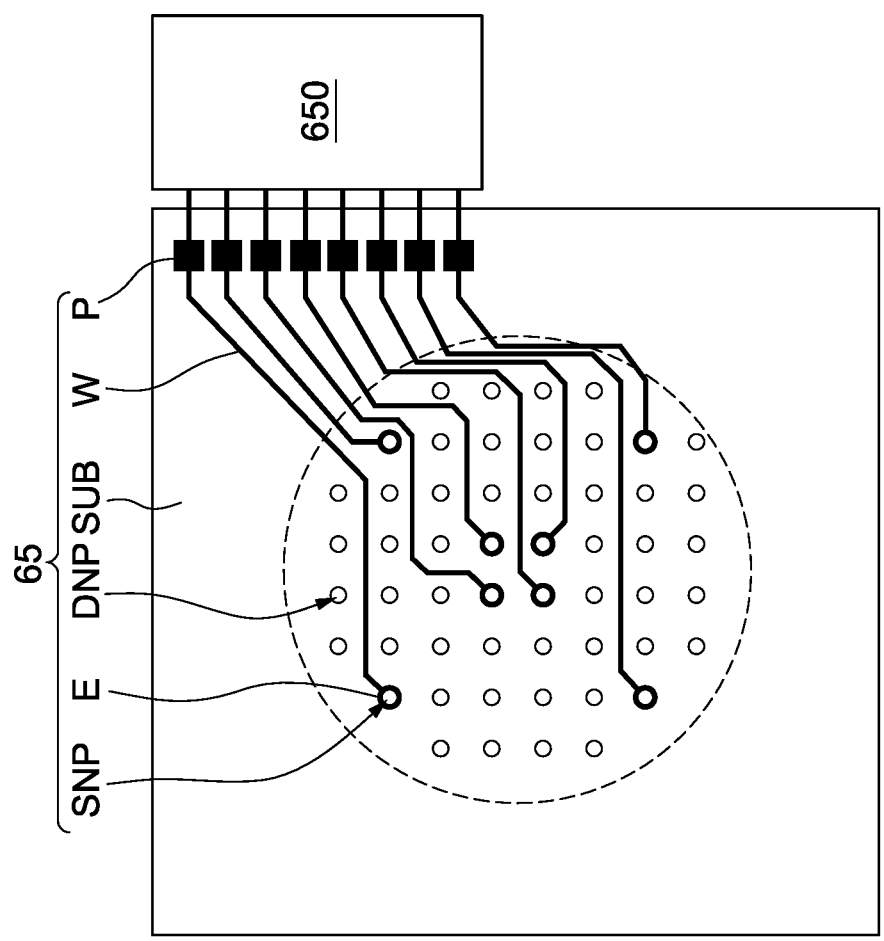
FIG. 6 is a plane view of the liquid particle counter in accordance with some embodiments of the present disclosure.

As above-mentioned, the liquid particle counter 15, 16 or 25 may include sensing electrodes. That is, the liquid particle counter 15, 16 or 25 may detect the particles in the solution by utilizing the sensing electrodes. FIG. 6 is a plane view of the liquid particle counter including the sensing electrodes.

Referring to FIG. 6, the liquid particle counter 65 may include a substrate SUB and a plurality of pairs of sensing electrodes E disposed on the substrate SUB. The substrate SUB may include a plurality of sensing nano-pores SNP and a plurality of dummy nano-pores DNP distributed therein, wherein the pore size of the sensing nano-pores SNP and the dummy nano-pores DNP is greater than the particle size of the nano-particles, allowing the nano-particles contained in the fluid passing through the sensing nano-pores SNP and the dummy nano-pores DNP. In some embodiments, the substrate SUB may be a semiconductor substrate (e.g., silicon substrate), and the sensing nano-pores SNP and the dummy nano-pores DNP distributed in the substrate SUB may be fabricated through photolithography and etch processes, for example. The pairs of sensing electrodes E are disposed on the substrate SUB. Each pair of sensing electrodes E is located adjacent to or around one of the sensing nano-pores SNP, respectively. As shown in FIG. 6, no sensing electrode is located adjacent to or around the dummy nano-pores DNP. The dummy nano-pores DNP may allow sufficient amount of fluid passing through the substrate SUB such that the flowrate of the fluid delivered in the sampling pipe may be maintained at a certain level. Since the dummy nano-pores DNP allows sufficient amount of fluid passing through the substrate SUB, the sampling rate is representative. In the present embodiment, the sensing nano-pores SNP and the dummy nano-pores DNP may be substantially identical in pore size. In some alternative embodiments, not shown in the drawings, the sensing nano-pores SNP and the dummy nano-pores DNP may be different in pore size.

As shown in FIG. 6, in the present embodiment, the number of the dummy nano-pores DNP is greater than the number of the sensing nano-pores SNP, for example. In addition, the sensing nano-pores SNP and the dummy nano-pores DNP are arranged in array, for example. However, the number of the dummy nano-pores DNP and the sensing nano-pores SNP fabricated in the substrate SUB is merely for illustration and the present invention is not limited thereto. For example, the liquid particle counter 65 may merely include one sensing nano-pore SNP, at least one dummy nano-pore DNP (i.e. one or a plurality of dummy nano-pores DNP) and one pair of sensing electrodes E that is positioned adjacent to the sensing nano-pore SNP.

In another aspect, the liquid particle counter 65 may include a substrate SUB and at least one pair of sensing electrodes E disposed on the substrate SUB. The substrate SUB may include a plurality of nano-pores, wherein the pore size of the nano-pores is greater than the particle size of the nano-particles, allowing the nano-particles contained in the fluid passing through the nano-pores of the substrate SUB. The at least one pair of sensing electrodes E is positioned adjacent to at least one of the nano-pores. Furthermore, the above-mentioned nano-pores may have substantially identical or different pore sizes. For example, the pore size of the nano-pores may be between about 5 nanometers to about 200 nanometers. In some embodiments, only a portion of the nano-pores (e.g., one nano-pore or more than one nano-pores) fabricated in the substrate SUB are defined as sensing nano-pores SNP and one pair or more than one pairs of sensing electrodes E are disposed in the proximity of the sensing nano-pores SNP correspondingly. In this case, the particle detector may monitor whether nano-particles is contained in the fluid or not. In some alternative embodiments, not shown in the drawings, all of the nano-pores fabricated in the substrate are defined as sensing nano-pores (i.e. no dummy nano-pore is fabricated in the substrate) and each pair of sensing electrodes is disposed in the proximity of one of the sensing nano-pores, respectively. In this case, the particle detector may count nano-particles contained in the fluid.

As illustrated in FIG. 6, the liquid particle counter 65 may further include a plurality of conductive wirings W and a plurality of conductive pads P disposed on the substrate SUB. In some embodiments, the pairs of sensing electrodes E are electrically connected to the control circuit 650 through the conductive wirings W and the conductive pads P on the substrate SUB, for example. In some alternative embodiments, the electrical connection between the pairs of sensing electrodes E and the control circuit 650 may be achieved through other suitable conductive medium, such as anisotropic conductive film (ACF), anisotropic conductive paste (ACP) or the like.

In some embodiments of the present disclosure, the liquid particle counter 15, 16 or 25 may be the same as or similar to the liquid particle counter 65.

It will be further appreciated that the foregoing method may be used for testing the filter used in the ultrapure water.

According to some embodiments of the present disclosure, a method for testing a filter, which is used for removing particles from ultrapure water, comprises: providing a first testing solution having a number of particles; detecting the particles in the first testing solution by a first particle counter; passing the first testing solution through a filter; and detecting the particles in the first testing solution, which is passed through the filter, by a second particle counter. The particles in the first testing solution have a particle size.

According to some other embodiments of the present disclosure, a method for testing a filter, which is used for removing particles from ultrapure water, comprises: preparing a first testing solution with particles; preparing a first particle counter and a second particle counter; detecting the particles of the first testing solution by the first particle counter; passing the first testing solution through a filter; detecting the particles of the first testing solution by the second particle counter after the first testing solution passes through the filter; and calculating a first data detected by the first particle counter and a second data detected by the second particle counter.

According to still some other embodiments of the present disclosure, a system for testing a filter, which is used for removing particles from ultrapure water, comprises: a container receiving a testing solution, a first passageway in fluid communication with the container, a jig used for mounting a filter to be tested, wherein the jig is connected to the first passageway and downstream of the first passageway, a second passageway connecting to the jig and downstream of the jig, a first particle counter connected to the first passageway and a second particle counter connected to the second passageway.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for testing a filter, comprising:
providing a first testing solution with a number of particles;
detecting the number of the particles in the first testing solution by a first particle counter;
passing the first testing solution through the filter;
detecting the number of the particles in the first testing solution, which is passed through the filter, by a second particle counter; and
calculating a first data detected by the first particle counter and a second data detected by the second particle counter to obtain a filter retention efficiency of the filter;
wherein the number of the particles in the first testing solution is known and a particle size of the particles in the first testing solution is known, and wherein the number of the particles in the first testing solution is 100/ml to 500/ml and the particle size of the particles in the first testing solution is 20 nanometers to 50 nanometers.

2. The method of claim 1, wherein the first particle counter and the second particle counter are the same particle counter.

3. The method of claim 1, further comprising: controlling a flow rate of the first testing solution.

4. The method of claim 1, further comprising: controlling a pressure drop of the filter.

5. The method of claim 1, further comprising: comparing the known number of the particles in the first testing solution and the first data detected by the first particle counter.

6. The method of claim 1, further comprising:
providing a second testing solution with a number of particles;
detecting the number of the particles in the second testing solution by the first particle counter;
passing the second testing solution through the filter;
detecting the number of the particles in the second testing solution, which is passed through the filter, by the second particle counter; and
comparing a third data detected by the first particle counter and a fourth data detected by the second particle counter.

7. The method of claim 6, wherein the number of the particles in the first testing solution is known and a particle size of the particles in the first testing solution is known, and wherein the number of the particles in the first testing solution is known and a particle size of the particles in the second testing solution is known, and wherein the number of the particles in the second testing solution is different from the number of the particles in the first testing solution and/or the particle size of the particles in the second testing solution is different from the particle size of the particles in the first testing solution.

8. The method of claim 6, wherein the first testing solution and the second testing solution are prepared by diluting a high concentration solution with a number of particles, wherein the number of the particles in the high concentration solution is greater than the number of the particles in the first testing solution or the number of the particles in the second testing solution.

9. The method of claim 6, wherein the step of providing the first testing solution with the number of particles, the step of detecting the number of the particles in the first testing solution by the first particle counter, the step of passing the first testing solution through the filter and the step of detecting the number of the particles in the first testing solution, which is passed through the filter, by the second particle counter are performed in three cycles, and wherein the step of providing the second testing solution with the number of particles, the step of detecting the number of the particles in the second testing solution by the first particle counter; passing the second testing solution through the filter; and the step of detecting the number of the particles in the second testing solution, which is passed through the filter, by the second particle counter are performed in three cycles.

10. The method of claim 1, further comprising:
detecting a first pressure of the first testing solution before passing the first testing solution through the filter; and
detecting a second pressure of the first testing solution after passing the first testing solution through the filter.

11. The method of claim 1, wherein the step of providing a first testing solution with a number of particles, the step of detecting the number of the particles in the first testing solution by a first particle counter, the step of passing the first testing solution through the filter and the step of detecting the number of the particles in the first testing solution, which is passed through the filter, by a second particle counter are performed in three cycles.

12. The method of claim 1, further comprises: preparing the first testing solution by diluting a concentration solution, wherein a number of particles in the concentration solution is $10^5$/ml.

13. A method for testing a filter for filtering ultrapure water used in semiconductor manufacturing, comprising:
providing a first testing solution, wherein the first testing solution comprises nanometer-sized particles and wherein a number of the nanometer-sized particles in the first testing solution is known and a particle size of the nanometer-sized particles in the first testing solution is known;
detecting the first testing solution to obtain a first value regarding the number of the nanometer-sized particles in the first testing solution;
passing the first testing solution through the filter;
detecting the first testing solution to obtain a second value regarding the number of the nanometer-sized particles in the first testing solution; and
obtaining a filter retention efficiency of the filter based on the first value and the second value;
wherein the number of the nanometer-sized particles in the first testing solution is 100/ml to 500/ml and the particle size of the nanometer-sized particles in the first testing solution is 20 nanometers to 50 nanometers.

14. The method of claim 13, wherein the first value and the second value are obtained by a single particle counter or respective two particle counters.

15. The method of claim 14, prior to providing the first testing solution, further comprising:
providing a second testing solution;
detecting the second testing solution for multiple cycles to obtain a third value regarding a number of particles in the second testing solution;
performing the step of providing the second testing solution and the step of detecting the second testing solution so as to obtain the multiple third values; and
checking a detection efficiency of the particle counter by comparing the multiple third values.

16. A method for testing a filter for filtering ultrapure water used in semiconductor manufacturing, comprising:
preparing a test solution by diluting a concentration solutions, wherein the concentration solution comprises nanometer-sized particles;
providing the test solution in a container, wherein the test solution comprises the nanometer-sized particles from the concentration solution, and wherein a number of the nanometer-sized particles in the test solution is 100/ml to 500/ml and a particle size of the nanometer-sized particles in the testing solution is 20 nanometers to 50 nanometers;
drawing the test solution from the container into a first passageway;
detecting the nanometer-sized particles of the test solution by a first particle counter connected to the first passageway;
passing the test solution through the filter;
drawing the test solution into a second passageway;
detecting the nanometer-sized particles of the test solution by a second particle counter connected to the second passageway; and obtaining a filter retention efficiency of the filter based on results detected by the first particle counter and the second particle counter.

17. The method of claim 16, wherein the filter is mounted to a jag between the first passageway and the second passageway.

18. The method of claim 16, further comprising: controlling a flow rate of the testing solution in the first passageway by a flow rate controller.

19. The method of claim 16, further comprising:
   detecting a first pressure of the testing solution in the first passageway by a first pressure gauge connected to the first passageway; and
   detecting a second pressure of the testing solution in the second passageway by a second pressure gauge connected to the second passageway.

20. The method of claim 16, wherein a number of the nanometer-sized particles in the concentration solution is $10^5$/ml.

* * * * *